US008995966B2

(12) United States Patent
Aerrabotu (10) Patent No.: US 8,995,966 B2
(45) Date of Patent: Mar. 31, 2015

(54) RADIO INTERFACE LAYER DESIGN FOR SMARTPHONES

(71) Applicant: Motorola Mobility LLC, Libertyville, IL (US)

(72) Inventor: Naveen Aerrabotu, Gurnee, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 2 days.

(21) Appl. No.: 13/705,551

(22) Filed: Dec. 5, 2012

(65) Prior Publication Data
US 2014/0155041 A1     Jun. 5, 2014

(51) Int. Cl.
| H04M 3/42 | (2006.01) |
| H04W 4/00 | (2009.01) |
| G06F 13/10 | (2006.01) |
| G06F 9/44 | (2006.01) |
| G06F 9/455 | (2006.01) |
| H04B 1/38 | (2006.01) |

(52) U.S. Cl.
CPC ............ *H04W 4/003* (2013.01); *G06F 13/102* (2013.01); *G06F 9/44* (2013.01); *G06F 9/45504* (2013.01); *G06F 9/45516* (2013.01); *H04B 1/38* (2013.01)
USPC ........ 455/414.1; 455/418; 455/419; 455/420; 455/550.1

(58) Field of Classification Search
CPC . H04W 88/06; H04W 1/72519; H04W 40/24; H04W 4/003; H04W 48/18; H04W 36/0066; H04W 76/046; H04W 36/0083; H04W 48/08; H04W 4/008; H04W 52/0216; H04W 76/04; H04W 76/068; H04W 88/12; H04W 12/08; H04W 28/20; H04M 3/54; H04L 67/00; H04L 69/329; G06F 13/102; G06F 9/44; G06F 9/45504; G06F 9/45516; H04B 1/38

USPC .......... 455/414.1, 418, 419, 420, 550.1, 558, 455/552.1, 422.1, 557, 134, 411, 414.2
See application file for complete search history.

(56) References Cited

U.S. PATENT DOCUMENTS

| 5,490,275 A | 2/1996 | Sandvos et al. |
| 6,032,193 A * | 2/2000 | Sullivan ........................ 709/239 |
| 6,295,554 B1 * | 9/2001 | Karadogan et al. ........... 709/219 |

(Continued)

OTHER PUBLICATIONS

"ISR of PCT/US2013/071797".
Andrus, et al., "Cells: A Virtual Mobile Smartphone Architecture", Operating Systems Principles, ACM, 2 Penn Plaza, Suite 701 New York NY 10121-0701 USA, Oct. 23, 2011, pp. 173-187, XP058005753, DOI: 10.1145/2043556.2043574 ISBN: 978-1-4503-0977-6.

(Continued)

*Primary Examiner* — Khai M Nguyen
(74) *Attorney, Agent, or Firm* — Morris & Kamlay LLP (57) ABSTRACT

A method and system communicates a request between a user application and a modem within a wireless communication device. A radio interface layer (RIL) architecture includes an application framework which receives a hardware specific request as a first application programming interface (API) call from the user application. In response to receiving the request, the application framework sends a corresponding, second API call to a vendor radio interface layer (Vendor RIL) which provides an interface configured for communicating with a specific type of transceiver or modem. In one embodiment, the second API call is transmitted via a Java Native interface (JNI). The JNI provides access to software programs associated with the transceiver, which programs are written in a language that is different from Java. The Vendor RIL communicates with the modem using a modem protocol software corresponding to the specific type of modem to perform commands associated with the request.

14 Claims, 6 Drawing Sheets

(56) References Cited

U.S. PATENT DOCUMENTS

| | | | |
|---|---|---|---|
| 6,826,762 B2* | 11/2004 | Shell et al. | 719/328 |
| 8,134,978 B2* | 3/2012 | Purkayastha et al. | 370/332 |
| 2006/0222009 A1 | 10/2006 | Yao et al. | |
| 2008/0092149 A1* | 4/2008 | Rowbotham et al. | 719/321 |
| 2011/0141939 A1* | 6/2011 | Medapalli | 370/252 |
| 2011/0165896 A1* | 7/2011 | Stromberg et al. | 455/466 |
| 2011/0269456 A1* | 11/2011 | Krishnaswamy et al. | 455/426.1 |
| 2011/0286343 A1* | 11/2011 | Powell et al. | 370/252 |
| 2012/0257658 A1* | 10/2012 | Chang et al. | 375/222 |
| 2012/0264411 A1* | 10/2012 | Fraenkel | 455/416 |
| 2013/0102299 A1* | 4/2013 | Liu et al. | 455/418 |
| 2013/0286939 A1* | 10/2013 | Huang | 370/328 |
| 2014/0155041 A1* | 6/2014 | Aerrabotu | 455/414.1 |

OTHER PUBLICATIONS

Hu, et al., "Research and design of Dual-Network Dual-Standby in Radio Interface Layer based on Android", Computer Science and Network Technology (ICCSNT), 2011 International Conference on, IEEE, Dec. 24, 2011, pp. 2610-2613, XP032162251, DOI: 10.1109/ICCSNT.2011.6182502 ISBN: 978-1-4577-1586-0.

Marques, "Android Telephony Stack", Jul. 5, 2010, pp. 1-8, XP055120349, Retrieved from the Internet: URL:http://www.slideshare.net/dpsmarques/android-telephony-stack [retrieved on May 27, 2014].

Veron, et al., "Software interface for a multi technology system phone", CODEN: LUTEDX (TETS—5392)/1-123/(2000).

\* cited by examiner

RADIO INTERFACE LAYER DESIGN FOR SMARTPHONES

BACKGROUND

1. Technical Field

The present disclosure relates in general to wireless communication devices and in particular to radio transmission in wireless communication devices.

2. Description of the Related Art

Traditionally, wireless communication devices include radio interface layer (RIL) structures that are designed to provide multiple abstraction layers. Although these wireless communication devices generally utilize a single type of modem over the life-time of the wireless communication device, abstraction layers supporting implementation of various different types of modems are included within these traditional RIL structures. Furthermore, whenever a request is initiated, these traditional RIL structures must dynamically load libraries and other software components relevant to a specific modem, as part of an abstraction process, although a single type of modem is implemented.

BRIEF DESCRIPTION OF THE DRAWINGS

The described embodiments are to be read in conjunction with the accompanying drawings, wherein.

DETAILED DESCRIPTION

The illustrative embodiments provide a method and system for communicating a request between a user/client application and a transceiver within a wireless communication device. A radio interface layer (RIL) architecture includes a hardware dependent application framework which receives a hardware specific request as a first Application Programming Interface (API) call from the user application. In response to receiving the request, the hardware dependent application framework sends a corresponding, second API call to a vendor radio interface layer (Vendor RIL), which provides an interface configured for communicating with a specific type of transceiver or modem. In one embodiment, the second API call is transmitted via an inter-language translation interface such as a JAVA® Native interface (JNI). The JNI provides access to software programs directly associated with the transceiver, which programs are written in a language that is different from Java. The Vendor RIL communicates with the transceiver using transceiver protocol software corresponding to the specific type of transceiver to perform a command associated with the request.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein.

Figure 1:
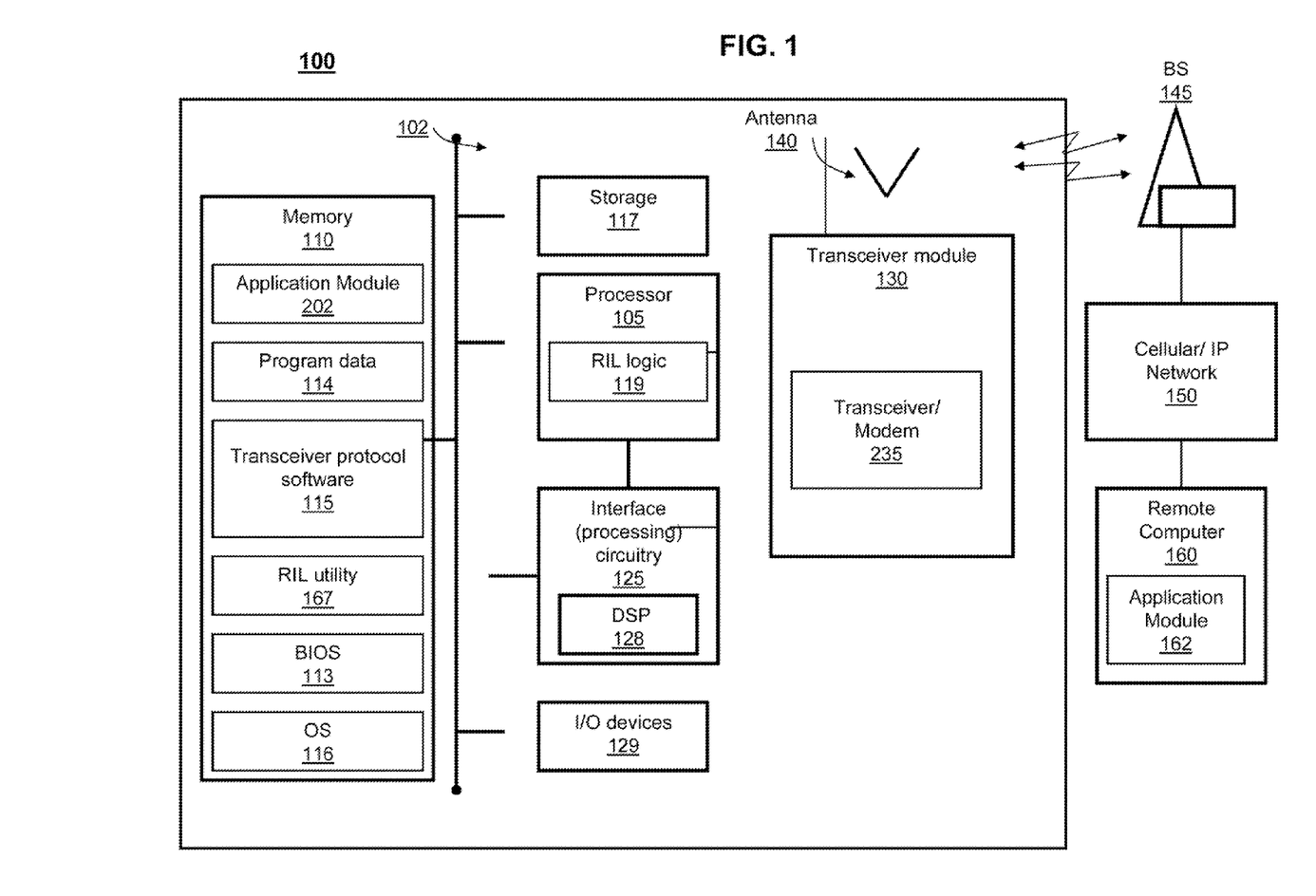
FIG. 1 is a block diagram illustrating an example wireless communication device within which the various features of the described embodiments can be advantageously implemented, according to one embodiment.

With specific reference now to FIG. 1, there is depicted a block diagram of an example wireless communication device 100, within which the functional aspects of the described embodiments may be implemented. Wireless communication device 100 represents a device that is adapted to transmit and receive electromagnetic signals over an air interface via uplink and/or downlink channels between the wireless communication device 100 and communication network equipment (e.g., base-station 145) utilizing at least one communication standard from among a plurality of different communication standards, such as Global System for Mobile Communications (GSM) Code Division Multiple Access (CDMA), Orthogonal Frequency Division Multiple Access (OFDMA), and similar systems. In one or more embodiments, the wireless communication device can be a mobile cellular device/phone or smartphone, or laptop, netbook or tablet computing device, or other types of communication devices. Wireless communication device 100 comprises processor 105 and interface circuitry 125, which are connected to memory component 110 via signal bus 102. Interface circuitry 125 includes digital signal processor (DSP) 128. Also illustrated within wireless communication device 100 are input/output (I/O) devices 129. Wireless communication device 100 also includes a transceiver module 130 for sending and receiving communication signals. Transceiver module 130 includes modem 235, which can also be referred to as a transceiver. In at least some embodiments, the sending and receiving of communication signals occur wirelessly and are facilitated by one or more antennas 140 coupled to the transceiver module 130. The number of antennas can vary from device to device, ranging from one to two or more antennas, and the presentation within wireless communication device 100 of one antenna 140 is merely for illustration.

Wireless communication device 100 is able to wirelessly communicate to base-station 145 via antenna 140. Base-station 145 can be any one of a number of different types of network stations and/or antennas associated with the infrastructure of the wireless network and configured to support uplink and downlink communication via one or more of the wireless communication protocols, as known by those skilled in the art.

In addition to the above described hardware components of wireless communication device 100, various features of the invention may be completed or supported via software or firmware code and/or logic stored within at least one of memory 110 and other storage 117, and respectively executed by DSP 128 or processor 105. Thus, for example, illustrated within memory 110 is a number of software, firmware, logic components, or modules, including application module 202, program data 114 and transceiver protocol software 115. In addition, memory 110 includes Basic Input/Output System (BIOS) 113, operating system 116 and radio interface layer (RIL) utility 167. RIL utility 167 is executed by processor 105 to provide RIL logic 119.

The various components within wireless communication device 100 can be electrically and/or communicatively coupled together as illustrated in FIG. 1. As utilized herein, the term "communicatively coupled" means that information signals are transmissible through various interconnections between the components. The interconnections between the components can be direct interconnections that include conductive transmission media, or may be indirect interconnections that include one or more intermediate electrical components. Although certain direct interconnections are illustrated in FIG. 1, it is to be understood that more, fewer or different interconnections may be present in other embodiments.

Figure 2:
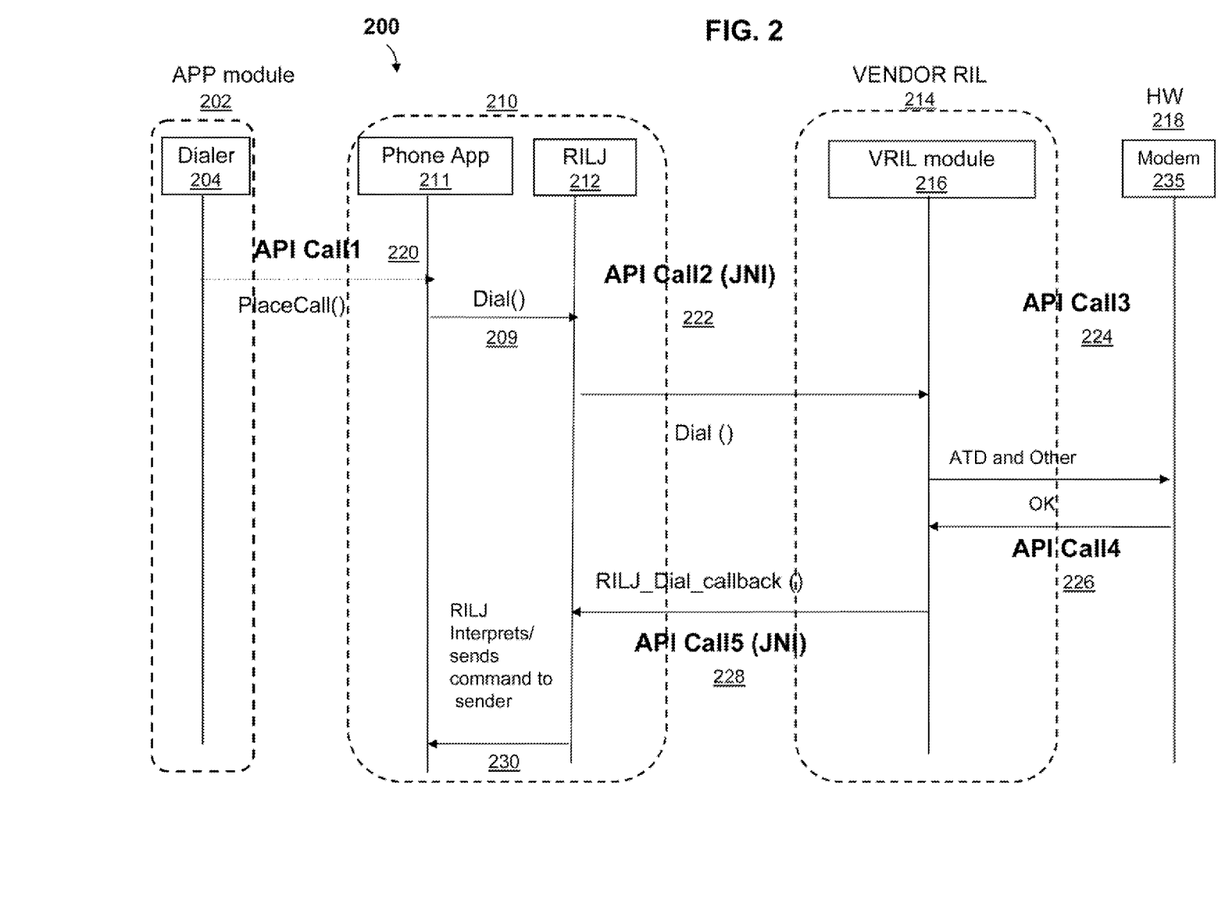
FIG. 2 is a message flow diagram illustrating an embodiment of a sequence of messages that are communicated to provide an application request.

FIG. 2 is a message flow diagram illustrating an embodiment of a sequence of messages that are communicated to provide an application request. Message flow structure 200 comprises application module 202, hardware dependent application framework 210, vendor radio interface layer (Vendor RIL) 214, and hardware module 218. Application module 202 comprises a number of software components and telephony applications (i.e., applications that require or use telephony services) including dialer application 204. Hardware dependent application framework 210 includes phone application 211 and Java based radio interface layer/component (RIL Java) 212. Vendor RIL (VRIL) 214 comprises VRIL module 216, and hardware module 218 includes modem 235 which communicates using modem protocol software. In one embodiment, message flow structure 200 includes an inter-language translation interface such as a JAVA® Native interface (JNI) located between RIL Java 212 and Vendor RIL 214. JAVA® is a registered trademark of Oracle, Inc. The JNI receives the second API call and forwards the second API call to Vendor RIL 214. Message flow structure 200 provides one embodiment of an RIL architecture that supports communication of a sequence of messages associated with a particular request that targets a specific type of modem.

Dialer application 204 is one example of a user interface application that captures a user's actions, and translates the user's actions into an appropriate radio API call (e.g., first API call 220) of phone application 211 within hardware dependent application framework 210. Short Message Service (SMS) and Unstructured Supplementary Service Data are also examples of user interface applications that can be provided by hardware dependent application framework 210. First API call 220 initiates a call/message sequence targeting a particular function(s) of a specific type of modem (e.g., modem 235). First API call is executed as a request for communication with an implemented modem (e.g., modem 235) of a specific type. The implemented modem is one type of modem selected for implementation within wireless communication device 100 from among various different types of modems corresponding to various different modem vendors. The various different types of modems may provide different features and capabilities and utilize different modem communication protocols. As a result, an RIL architecture is specifically developed based on the type of modem selected for implementation. The (first) API call represents specific operations that a corresponding user/client application (e.g., dialer application 204) can invoke at runtime to perform tasks that are specific to the type of the implemented modem. In one embodiment, the request for communication with modem 235 is made using an appropriate call function (e.g., "PlaceCall( )"). Phone application 211 of hardware dependent application framework receives first API call 220 and uses a "Dial( )" function to invoke functions of RIL Java 212 to initiate second API call 222. RIL Java 212 initiates second API call 222 to Vendor RIL 214 using a respective dial function.

In one embodiment, second API call 222 is executed as a Java Native interface (JNI) call. A JNI is located between RIL Java 212 and Vendor RIL 214 and receives second API call 222. In response to receipt of second API call 222, the JNI forwards second API call 222 to Vendor RIL 214. In particular, RIL Java 212 utilizes a first set of functions to send second API call 222 to the Vendor RIL 214. The JNI enables a second set of functions to call software programs directly associated with the specific type of implemented modem and with an operating system platform and libraries written in a language that is different from Java. The JNI is utilized to maintain communication using an API call mechanism throughout the RIL architecture corresponding to message flow structure 200.

In response to receipt of second API call 222, Vendor RIL module 216 sends third API call 224 to modem 235. Third API call 224 triggers establishment of communication with modem 235. For example, modem dial request commands such as "Attention Dial" ("ATD") commands, i.e., commands which represent dial commands for modems, are sent to modem 235 using third API call 224. In response to receipt of the ATD command, modem 235 responds with fourth API call 226 which provides an "OK" response from modem 235 to indicate acknowledgement of call establishment and servicing of the user's request. In one embodiment, communication between Vendor RIL 214 and modem 235 is supported using modem protocol software that is utilized by that specific type of modem 235. Vendor RIL 214 receives the "OK" response and sends fifth API call 228 by which Vendor RIL 214 calls RIL Java 212 to provide acknowledgement and/or a status of the response to the user's request. For example, Vendor RIL 214 calls RIL Java 212 using a "Dial_callback( )" function. RIL Java 212 interprets the response and sends corresponding response message 230 to hardware dependent application framework 210.

Figure 3:
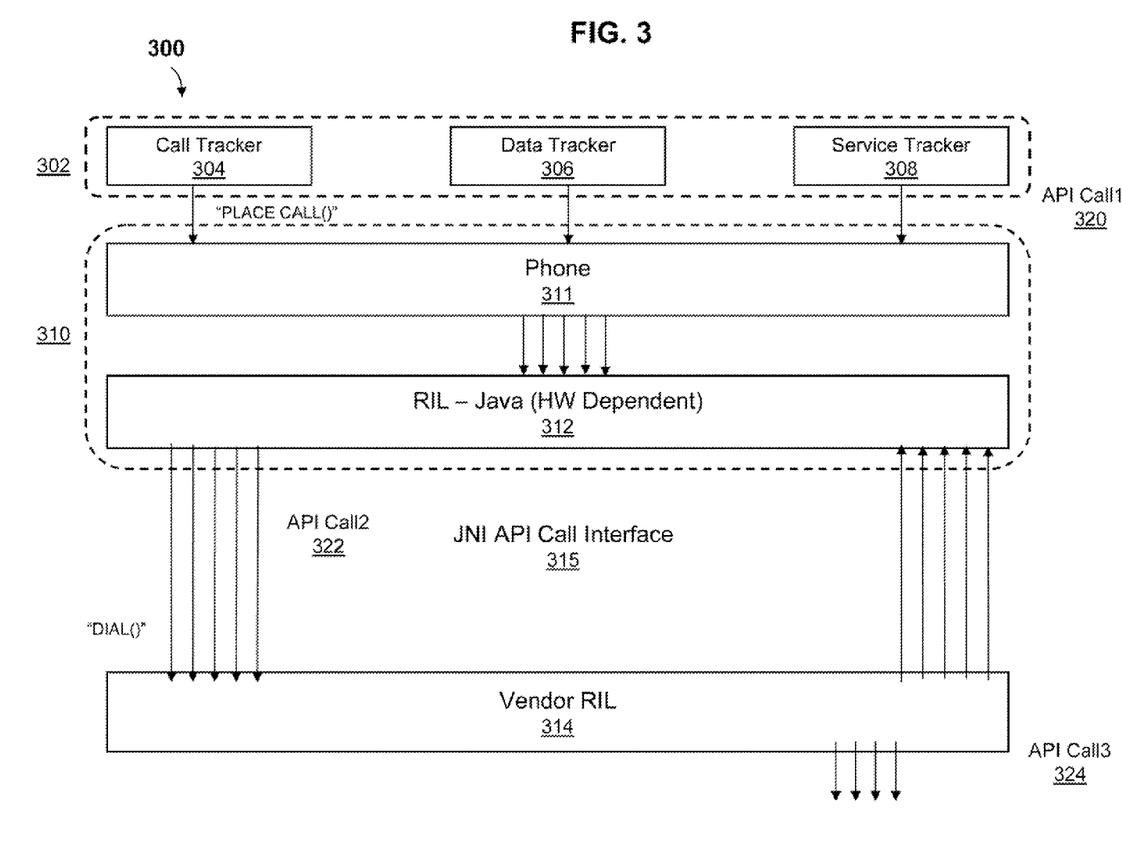
FIG. 3 is a block diagram illustrating an embodiment of a radio interface layer (RIL) structure.

FIG. 3 is a block diagram illustrating an embodiment of a radio interface layer (RIL) structure 300. RIL structure 300 comprises application module 302, hardware dependent application framework 310 and vendor radio interface layer (Vendor RIL) 314. In addition, RIL structure 300 includes Java Native interface (JNI) 315, which is an API located between hardware dependent application framework 310 and Vendor RIL 314. Application module 302 comprises a number of software components including call tracker 304, data tracker 306 and service tracker 308. Hardware dependent application framework 310 includes phone application 311 and Java based radio interface layer/component (RIL Java) 312. RIL structure 300 supports communication of a sequence of messages associated with a particular request which targets a specific type of modem.

Call tracker 304 executes first API Call1 320 specifically as a request for communication with an implemented modem (e.g., modem 235 (FIG. 2)). Phone application 311 of hardware dependent application framework 310 receives first API call 320 and invokes functions of RIL Java 312 to send second API call 322 which continues to propagate the request targeting the implemented modem (e.g., modem 235).

In one embodiment, second API call 322 sent to the VRIL through the JNI maps a single API to a single request. The single API is uniquely associated with at least one of (a) a specific hardware function of modem 235 and (b) a specific radio access technology. The single request, which utilizes the single API, is provided as a hardware specific request.

In another embodiment, second API call 322 sent to the Vendor RIL through the JNI maps a single corresponding API to at least two requests. The single corresponding API is uniquely associated with at least two specific hardware functions of modem 235. The received request is a hardware specific request, which is identified as one of the at least two requests at modem 235. Vendor RIL 314 initiates third API call 324 to the implemented modem (e.g., modem 235).

In one embodiment, a first set of functions maintains communication of a received request through an API interface and provides serialization of API calls received by hardware dependent application framework 310 utilizing at least one of (a) a request priority and (b) a time of request initiation. In one embodiment, the first set of functions is provided by the instruction set of at least one of (a) RIL Java 312 and (b) the Vendor RIL 314.

In one embodiment, the first set of functions is configured to enable the received request to be transmitted as a modem specific request using a communication protocol specified for the specific type of modem. Furthermore, the first set of functions is configured to prevent utilization of an abstraction interface which is not directly associated with any specific type of modem.

Figure 4:
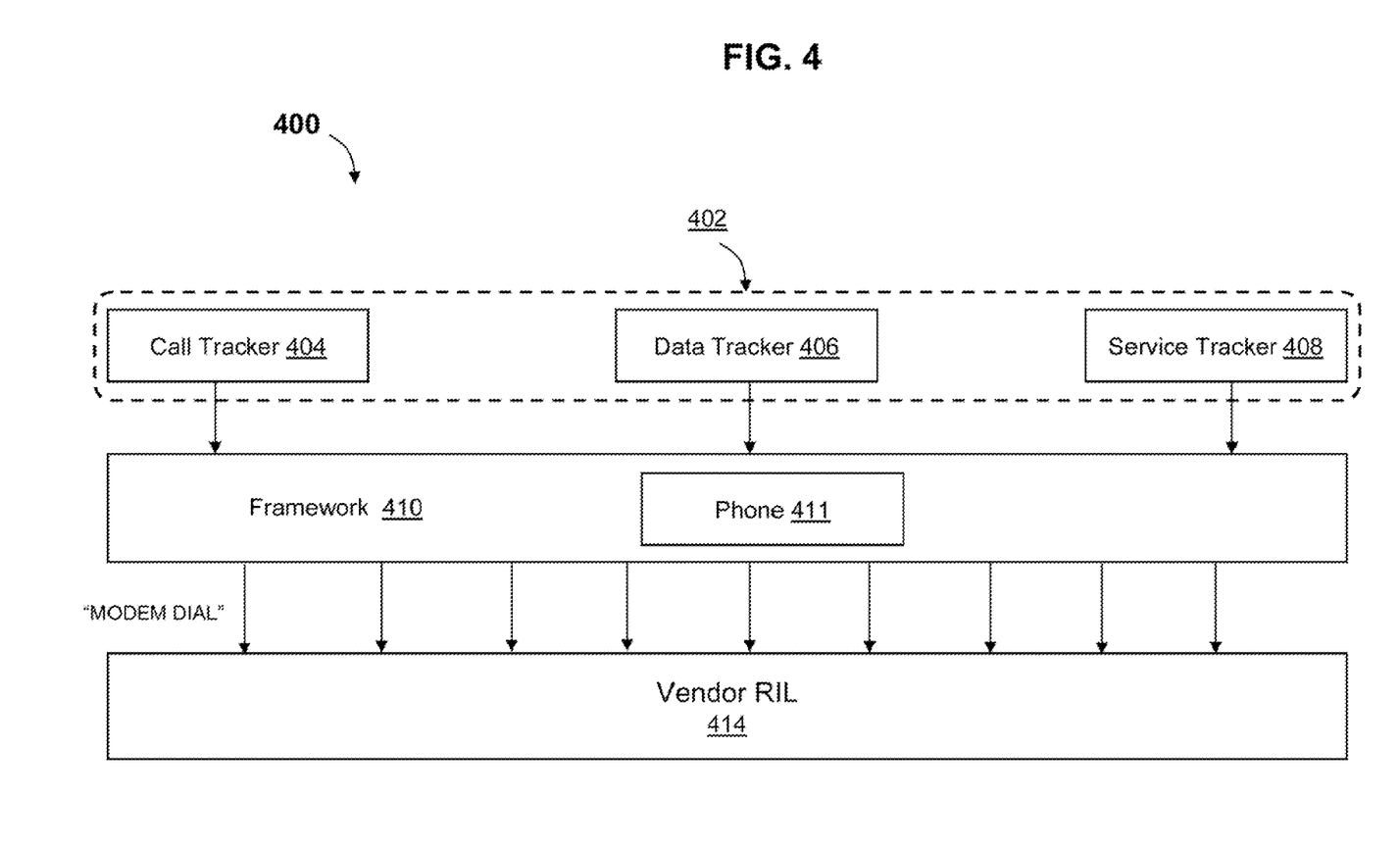
FIG. 4 is a block diagram illustrating another embodiment of a radio interface layer (RIL) structure.

FIG. 4 is a block diagram illustrating an embodiment of a radio interface layer (RIL) structure. RIL structure 400 comprises application module 402, hardware dependent application framework 410 and vendor radio interface layer (Vendor RIL) 414. Application module 402 comprises a number of software components including call tracker 404, a data tracker 406, and a service tracker 408. Hardware dependent application framework 410 includes phone application 411.

The similar aspects of RIL structure 400 can be described in a similar manner to RIL structure 300. However, unlike RIL structure 300, RIL structure 400 does not explicitly provide a distinct Java based radio interface layer/component (RIL Java). In one embodiment, the features and functions of the RIL Java are merged with phone application 411. Thus, in one embodiment, in response to receipt of a first API call at hardware dependent application framework 410, the relevant functions used to provide a second API call are automatically and directly activated to continue propagating to Vendor RIL 414 a request that targets the implemented modem.

Figure 5:
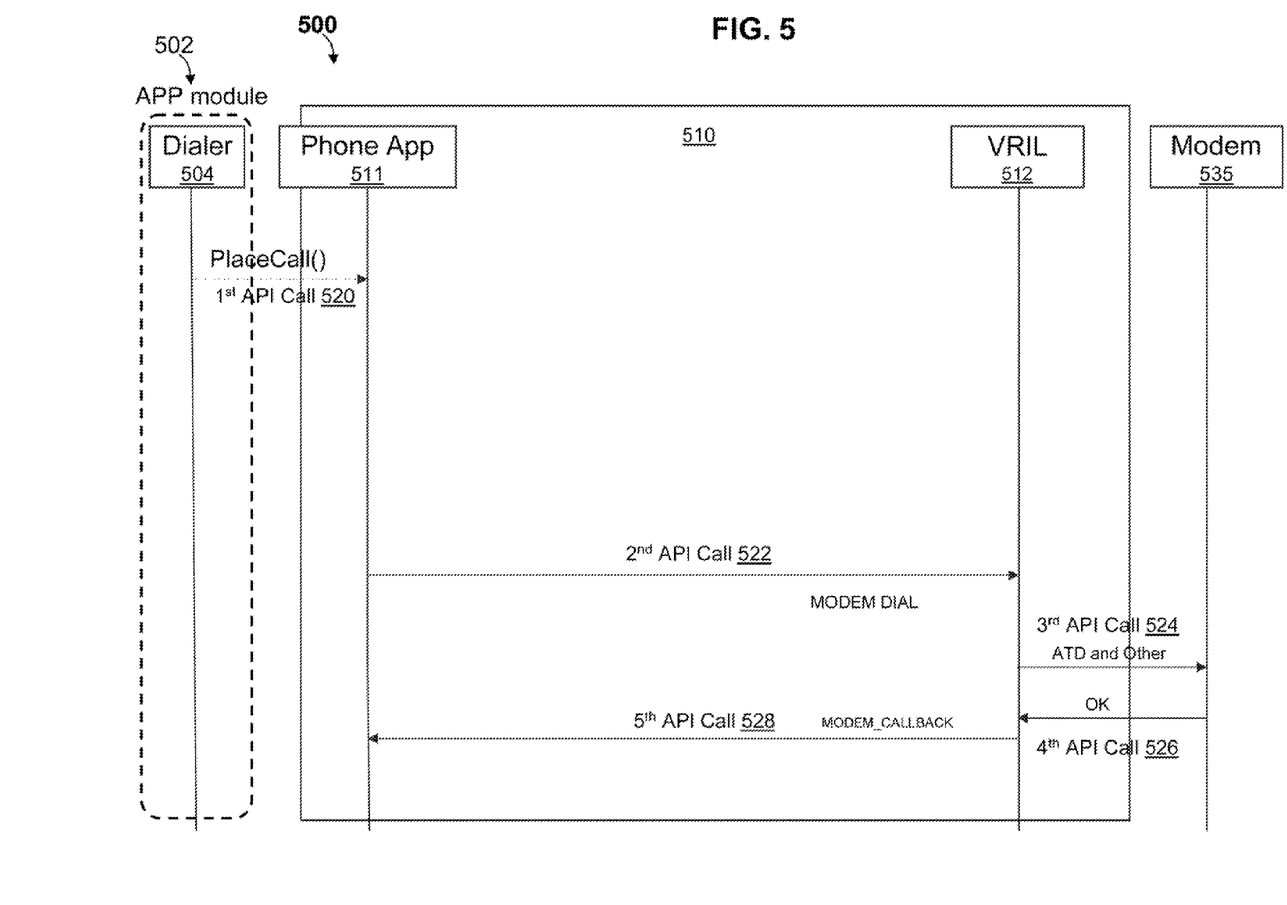
FIG. 5 is a message flow diagram illustrating another embodiment of a sequence of messages that are communicated to provide an application request.

FIG. 5 is a message flow diagram illustrating a sequence of messages that are communicated to provide an application request, according to one embodiment. Message flow structure 500 comprises application module 502, hardware dependent application framework 510 and modem 535. Application module 502 includes dialer application 504. Hardware dependent application framework 510 includes phone application 511 and Vendor RIL module 512. Unlike RIL structures 300 and 400, RIL structure 500 does include Vendor RIL module 512 within hardware dependent application framework 510. Modem 535 communicates using a specific modem protocol software. RIL structure 500 supports communication of a sequence of messages associated with a particular request that targets a specific type of an implemented modem.

Dialer application 504 is used to initiate first radio API call 520. First radio API call 520 initiates a message sequence targeting a particular function(s) (e.g., radio transmission related functions such as dial functions and SMS functions) of a specific type of modem (e.g., modem 535). Phone application 511 of hardware dependent application framework 510 receives first API call 520 and initiates second API call 522 to the Vendor RIL 512 using a respective dial function in order to continue propagation of the request to the implemented modem.

In response to receipt of second API call 522, Vendor RIL 512 sends third API call 524 to modem 535. Third API call 524 establishes communication with modem 535. For example, modem dial request commands, such as "ATD" commands, are sent to modem 535 using third API call 524. In response to receipt of the ATD command, modem 535 responds with fourth API call 526 which provides an "OK" response from modem 535 to indicate acknowledgement of call establishment and servicing of the user's request. Vendor RIL 512 receives the "OK" response and sends fifth API call 528 by which Vendor RIL 512 calls phone application 511 to provide acknowledgement and/or a status of the response to the user's request. For example, Vendor RIL 512 calls phone application 511 using a "Dial_callback( )" function.

Figure 6:
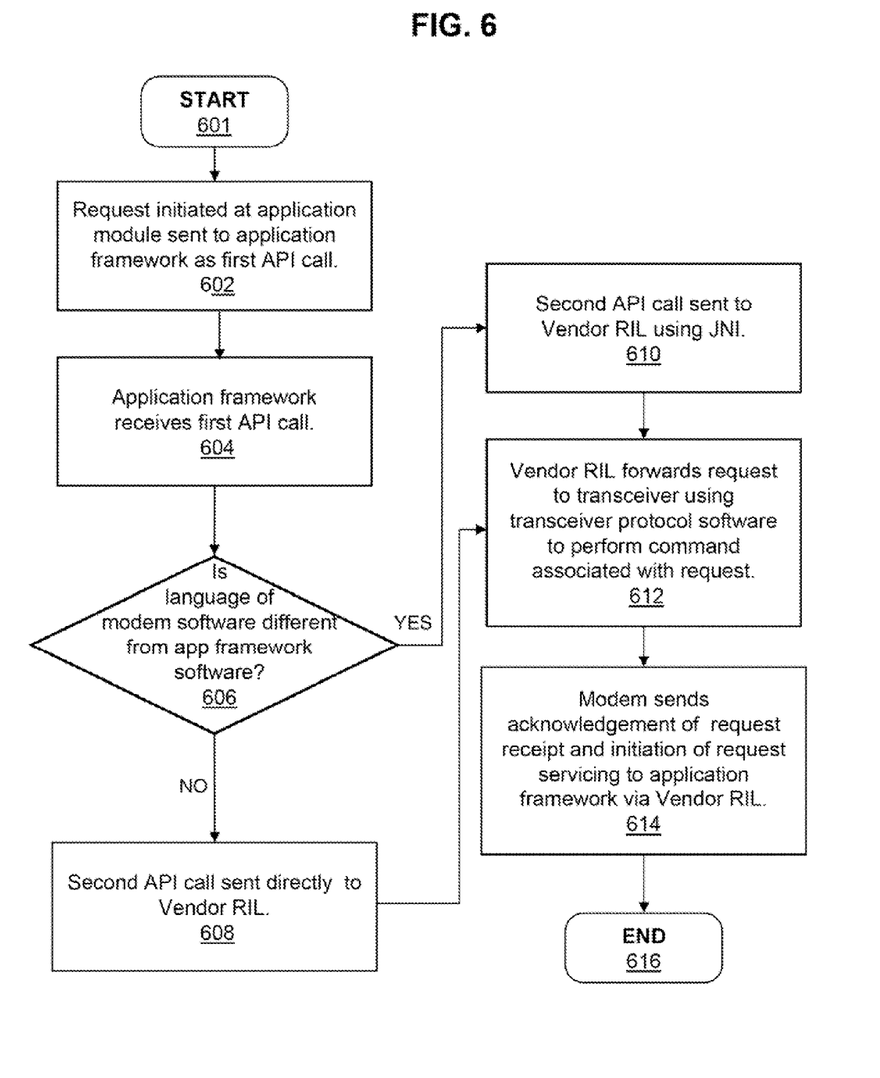
FIG. 6 is a flow chart illustrating one embodiment of a method for communicating a request from an application module to a transceiver within a wireless communication device.

FIG. 6 is a flow chart illustrating one embodiment of the method by which the above processes of the illustrative embodiments can be implemented. Specifically, FIG. 6 illustrates one embodiment of a method for communicating a request from an application module to a modem within a wireless communication device. Although the method illustrated by FIG. 6 may be described with reference to components and functionality illustrated by and described in reference to FIGS. 1-5, it should be understood that this is merely for convenience and alternative components and/or configurations thereof can be employed when implementing the method. Certain portions of the methods may be completed by RIL utility 167 executing on one or more processors (processor 105 or DSP 128) within wireless communication device 100 (FIG. 1). The executed processes then control specific operations of or on wireless communication device 100. For simplicity in describing the method, all method processes are described from the perspective of RIL utility 167 and/or wireless communication device 100.

The method of FIG. 6 begins at start block 601 and proceeds to block 602 at which a request initiated at application module 202 is sent as a hardware specific request to hardware dependent application framework 210 via first API call 220. At block 604, phone application 211 or RIL Java 212 within hardware dependent application framework 210 receives first API call 220. At decision block 606, RIL utility 167 determines whether Java is the language of software programs utilized by the modem and by corresponding software programs and components of hardware dependent application framework 210. More generally, RIL utility 167 determines whether a common or shared language is utilized by hardware dependent application framework 210 and by corresponding software programs and components of the modem. If at decision block 606 RIL utility 167 determines that a common or shared language (e.g., Java) is utilized by respective software programs of hardware dependent application framework 210 and modem 235, hardware dependent application framework 210 sends second API call 222 directly to Vendor RIL 214, as shown at block 608. However, if, at decision block 606, RIL utility 167 determines that a common or shared language (e.g., Java) is not utilized by some respective software programs of hardware dependent application framework 210 and modem 235, hardware dependent application framework 210 sends second API call 222 via a Java Native Interface (JNI) to Vendor RIL 214, as shown at block 610. The RIL architecture utilizes the JNI to maintain use of an API call mechanism for transmitting requests between the hardware dependent application framework 210 and modem 235. At block 612, Vendor RIL 214 forwards the received request to modem 235 using third API call 224 to enable modem 235 to perform commands associated with the request. Vendor RIL 214 forwards the received request using modem protocol software that is specifically utilized by the particular type of modem 235. At block 614, modem 235 sends acknowledgement of receipt of the request and initiation of request servicing to hardware dependent application framework 210 via Vendor RIL 214. The process ends at block 616.

The flowchart and block diagrams in the various figures presented and described herein illustrate the architecture, functionality, and operation of possible implementations of systems, methods and computer program products according to various embodiments of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Thus, while the method processes are described and illustrated in a particular sequence, use of a specific sequence of processes is not meant to imply any limitations on the disclosure. Changes may be made with regards to the sequence of processes without departing from the spirit or scope of the present disclosure. Use of a particular sequence is therefore, not to be taken in a limiting sense, and the scope of the present disclosure extends to the appended claims and equivalents thereof.

In some implementations, certain processes of the methods are combined, performed simultaneously or in a different order, or perhaps omitted, without deviating from the spirit and scope of the disclosure. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A wireless communication device comprising:
   at least one processor;
   a modem communicatively connected to the at least one processor;
   a storage sub-system;
   an application module located within the storage sub-system, the application model including a user interface application that initiates a first application programmable interface (API) call based on a received request; and
   a radio interface layer (RIL) architecture configured to support communications between the user interface application and the modem, the RIL architecture including a hardware-dependent application framework that, in response to receiving the first API call from the application module, sends, based on a first set of functions that prevent utilization of an abstraction interface not directly associated a specific type of modem, a corresponding second API call to a vendor radio interface layer (Vendor RIL) that provides an interface configured for communicating with the specific type of modem using a modem protocol software corresponding to the specific type of modem to perform a command associated with the received request.

2. The wireless communication device of claim 1, wherein the hardware dependent application framework further comprises:
   a Java based radio interface layer (RIL Java) that receives the first API call and that utilizes the first set of functions to send the second API call to the Vendor RIL; and
   a Java Native interface (JNI) located between the RIL Java and the Vendor RIL, wherein the JNI receives the second API call, forwards the second API call to the Vendor RIL, and enables a second set of functions to call software programs associated with the specific type of modem and with an operating system platform and a library written in a language that is different from Java.

3. The wireless communication device of claim 2, wherein:
   the second API call sent to the VRIL through the JNI utilizes a single corresponding API that is mapped to a single request and that is uniquely associated with at least one of (a) a specific hardware function of the modem or (b) a specific radio access technology, wherein the single request is provided as a hardware specific request.

4. The wireless communication device of claim 2, wherein:
   the second API call sent to the Vendor RIL through the JNI utilizes a single corresponding API that is mapped to at least two requests and that is uniquely associated with at least two specific hardware functions of the modem; and
   wherein the received request is a hardware specific request that is identified at the modem as one of the at least two requests.

5. The wireless communication device of claim 2, wherein:
   the first set of functions maintains communication of a received request through an API interface and provides serialization of API calls received by the hardware dependent application framework utilizing at least one of (a) a request priority or (b) a time of request initiation.

6. The wireless communication device of claim 2, wherein:
   the first set of functions is configured to enable the received request to be transmitted as a modem specific request using a communication protocol specified for the specific type of modem.

7. The wireless communication device of claim 1, wherein:
   the first set of functions is provided by the instruction set of at least one of: (a) the RIL Java or (b) the Vendor RIL.

8. A method for communicating between an application module and a modem within a wireless communication device, the method comprising:
   initiating a first application programmable interface (API) call based on a received request;
   detecting receipt of the first API call from the application module at a phone application of a hardware dependent application framework within a radio interface layer (RIL) architecture;
   in response to detecting receipt of the first API call at the phone application, sending, based on a first set of functions that prevent utilization of an abstraction interface not directly associated a specific type of modem, a corresponding second API call to a vendor radio interface layer (Vendor RIL) that provides an interface configured for communicating with the specific type of modem; and
   initiating communication between the Vendor RIL and the specific type of modem using a modem protocol software to perform a command associated with the received request.

9. The method of claim 8, further comprising:
   receiving the second API call at a Java Native interface (JNI) located between the phone application and the Vendor RIL, wherein the hardware dependent application framework includes a Java based radio interface layer (RIL Java) that utilizes a first set of functions to send the second API call; and
   forwarding the second API call to the Vendor RIL, wherein the JNI enables a second set of functions to call software programs directly associated with a specific type of modem and with an operating system platform and a library written in a language that is different from Java.

10. The method of claim 9, wherein:
    the second API call sent to the VRIL through the JNI utilizes a single corresponding API that is mapped to a single request and that is uniquely associated with at least one of (a) a specific hardware function of the modem or (b) a specific radio access technology, wherein the single request is provided as a hardware specific request.

11. The method of claim 9, wherein:
    the second API call sent to the Vendor RIL through the JNI utilizes a single corresponding API that is mapped to at least two requests and that is uniquely associated with at least two specific hardware functions of the modem; and
    wherein the received request is a hardware specific request that is identified at the modem as one of the at least two requests.

12. The method of claim 9, wherein:
    the first set of functions maintains communication of a received request through an API interface and provides serialization of API calls received by the hardware dependent application framework utilizing at least one of (a) a request priority or (b) a time of request initiation.

13. The method of claim 9, wherein:
    the first set of functions is configured to enable the received request to be transmitted as a modem specific request using a communication protocol specified for the specific type of modem.

14. The method of claim 8, wherein:
    the first set of functions is provided by the instruction set of at least one of: (a) the RIL Java or (b) the Vendor RIL.

* * * * *